(12) United States Patent
Lee et al.

(10) Patent No.: US 9,400,772 B2
(45) Date of Patent: Jul. 26, 2016

(54) METHOD AND DEVICE FOR SELECTING A WORD TO BE DEFINED IN MOBILE COMMUNICATION TERMINAL HAVING AN ELECTRONIC DICTIONARY

(71) Applicant: Samsung Electronics Co., Ltd., Suwon-si, Gyeonggi-do (KR)

(72) Inventors: Seok-Gon Lee, Gumi-si (KR); Jae-Gon Son, Daegu (KR); Ki-Tae Kim, Gumi-si (KR); Yong-Hee Han, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/253,398

(22) Filed: Apr. 15, 2014

(65) Prior Publication Data

US 2014/0229825 A1     Aug. 14, 2014

Related U.S. Application Data

(63) Continuation of application No. 11/743,335, filed on May 2, 2007.

(30) Foreign Application Priority Data

May 4, 2006    (KR) .................. 10-2006-0040692

(51) Int. Cl.
     *G06F 17/27*      (2006.01)
     *G06F 17/22*      (2006.01)

(52) U.S. Cl.
     CPC ........ *G06F 17/2276* (2013.01); *G06F 17/2735* (2013.01)

(58) Field of Classification Search
     USPC .................................................. 704/1, 9, 10
     See application file for complete search history.

(56) References Cited

U.S. PATENT DOCUMENTS

| | | | |
|---|---|---|---|
| 4,579,533 A * | 4/1986 | Anderson et al. | 434/157 |
| 5,748,931 A * | 5/1998 | Jones | G06F 3/0481 715/853 |
| 5,802,536 A * | 9/1998 | Yoshii et al. | 715/255 |
| 5,810,599 A * | 9/1998 | Bishop | 434/157 |
| 5,822,720 A | 10/1998 | Bookman et al. | |
| 5,930,787 A | 7/1999 | Minakuchi et al. | |

(Continued)

FOREIGN PATENT DOCUMENTS

| | | |
|---|---|---|
| EP | 0810534 | 12/1997 |
| GB | 02336694 | 10/1999 |

(Continued)

OTHER PUBLICATIONS

Non-Final Office Action issued on May 16, 2012 in U.S. Appl. No. 12/721,321.

(Continued)

*Primary Examiner* — Lamont Spooner

(74) *Attorney, Agent, or Firm* — Jefferson IP Law, LLP

(57) ABSTRACT

A method and device for selecting a word to be defined in a mobile communication terminal having an electronic dictionary function. The method includes selecting a word in a displayed text document in response to a first input, displaying the selected word in a search window, searching for the displayed word in response to a request to search for the displayed word, displaying information resulting from the search, and terminating display of the information and displaying the text document.

17 Claims, 4 Drawing Sheets

(56) References Cited

U.S. PATENT DOCUMENTS

| | | | |
|---|---|---|---|
| 5,953,541 A * | 9/1999 | King et al. ................. 710/67 |
| 5,956,034 A * | 9/1999 | Sachs et al. ................. 715/776 |
| 5,973,694 A * | 10/1999 | Steele ................. G06F 3/0481 |
| | | | 434/116 |
| 5,999,903 A * | 12/1999 | Dionne et al. ................. 704/271 |
| 6,128,635 A * | 10/2000 | Ikeno ................. 715/246 |
| 6,286,064 B1 * | 9/2001 | King et al. ................. 710/67 |
| 6,331,867 B1 | 12/2001 | Eberhard et al. |
| 6,557,026 B1 * | 4/2003 | Stephens, Jr. ................. 709/203 |
| 6,704,034 B1 * | 3/2004 | Rodriguez ................. G06F 3/0481 |
| | | | 715/764 |
| 6,874,126 B1 * | 3/2005 | Lapidous ................. 715/711 |
| 6,961,722 B1 | 11/2005 | Bruecken |
| 7,051,018 B2 * | 5/2006 | Reed et al. |
| 7,080,317 B2 * | 7/2006 | Lebow ................. G06F 17/24 |
| | | | 715/236 |
| 7,100,123 B1 * | 8/2006 | Todd et al. ................. 715/862 |
| 7,127,673 B2 * | 10/2006 | Iwata ................. G06F 17/211 |
| | | | 715/209 |
| 7,366,500 B1 * | 4/2008 | Yalovsky et al. ................. 455/414.1 |
| 7,453,439 B1 * | 11/2008 | Kushler et al. ................. 345/168 |
| 7,619,615 B1 * | 11/2009 | Donoghue ................. G06F 3/04895 |
| | | | 345/169 |
| 7,849,393 B1 * | 12/2010 | Hendricks et al. ................. 715/203 |
| RE42,904 E * | 11/2011 | Stephens, Jr. ................. 709/203 |
| 8,397,163 B1 * | 3/2013 | Sran ................. 715/712 |
| 2002/0013815 A1 * | 1/2002 | Obradovich et al. ................. 709/204 |
| 2002/0019731 A1 * | 2/2002 | Masui et al. ................. 704/7 |
| 2002/0087584 A1 * | 7/2002 | Hung ................. 707/200 |
| 2002/0094512 A1 * | 7/2002 | Bhogal et al. ................. 434/169 |
| 2002/0095447 A1 * | 7/2002 | Weber et al. ................. 707/530 |
| 2002/0113827 A1 * | 8/2002 | Perlman et al. ................. 345/840 |
| 2002/0116420 A1 * | 8/2002 | Allam et al. ................. 707/526 |
| 2003/0160830 A1 * | 8/2003 | DeGross ................. 345/808 |
| 2003/0179247 A1 * | 9/2003 | Yu ................. 345/840 |
| 2003/0208376 A1 * | 11/2003 | Vennum et al. ................. 705/2 |
| 2004/0068527 A1 * | 4/2004 | Smith, III ................. 707/204 |
| 2004/0080528 A1 * | 4/2004 | Rand et al. ................. 345/738 |
| 2004/0139400 A1 * | 7/2004 | Allam et al. ................. 715/526 |
| 2004/0143795 A1 * | 7/2004 | Matsuishi ................. 715/530 |
| 2004/0201633 A1 * | 10/2004 | Barsness et al. ................. 345/864 |
| 2004/0205672 A1 * | 10/2004 | Bates et al. ................. 715/533 |
| 2004/0217944 A1 * | 11/2004 | Kong ................. 345/173 |
| 2004/0267537 A1 * | 12/2004 | Nakamura et al. ................. 704/276 |
| 2005/0005248 A1 * | 1/2005 | Rockey et al. ................. 715/853 |
| 2005/0043949 A1 * | 2/2005 | Roth et al. ................. 704/251 |
| 2005/0076300 A1 * | 4/2005 | Martinez ................. 715/539 |
| 2005/0080880 A1 * | 4/2005 | von Tetzchner et al. ................. 709/219 |
| 2005/0283798 A1 * | 12/2005 | Hunleth ................. G06F 3/0481 |
| | | | 725/37 |
| 2006/0080083 A1 * | 4/2006 | Lin et al. ................. 704/8 |
| 2006/0147888 A1 * | 7/2006 | Burghardt et al. ................. 434/323 |
| 2006/0235677 A1 * | 10/2006 | Chen et al. ................. 704/9 |
| 2007/0005338 A1 * | 1/2007 | Vrijsen ................. 704/3 |
| 2007/0028184 A1 * | 2/2007 | Jang ................. 715/769 |
| 2007/0061753 A1 * | 3/2007 | Ng et al. ................. 715/816 |
| 2007/0073713 A1 * | 3/2007 | Thomas ................. 707/10 |
| 2007/0192734 A1 * | 8/2007 | Berstis et al. ................. 715/808 |
| 2007/0233692 A1 * | 10/2007 | Lisa et al. ................. 707/10 |
| 2007/0244858 A1 * | 10/2007 | Streetman ................. 707/3 |
| 2007/0294078 A1 * | 12/2007 | Kim et al. ................. 704/2 |

FOREIGN PATENT DOCUMENTS

| | | |
|---|---|---|
| KR | 10-2002-0026629 | 4/2002 |
| TW | 476891 | 2/2002 |
| WO | 00-45299 | 8/2000 |

OTHER PUBLICATIONS

Peterson, Computer Programs for Detecting and Correcting Spelling Errors, Communications of the ACM, vol. 23 No. 12, Dec. 1980, pp. 676-87.

European Search Report dated Jan. 5, 2009.

* cited by examiner

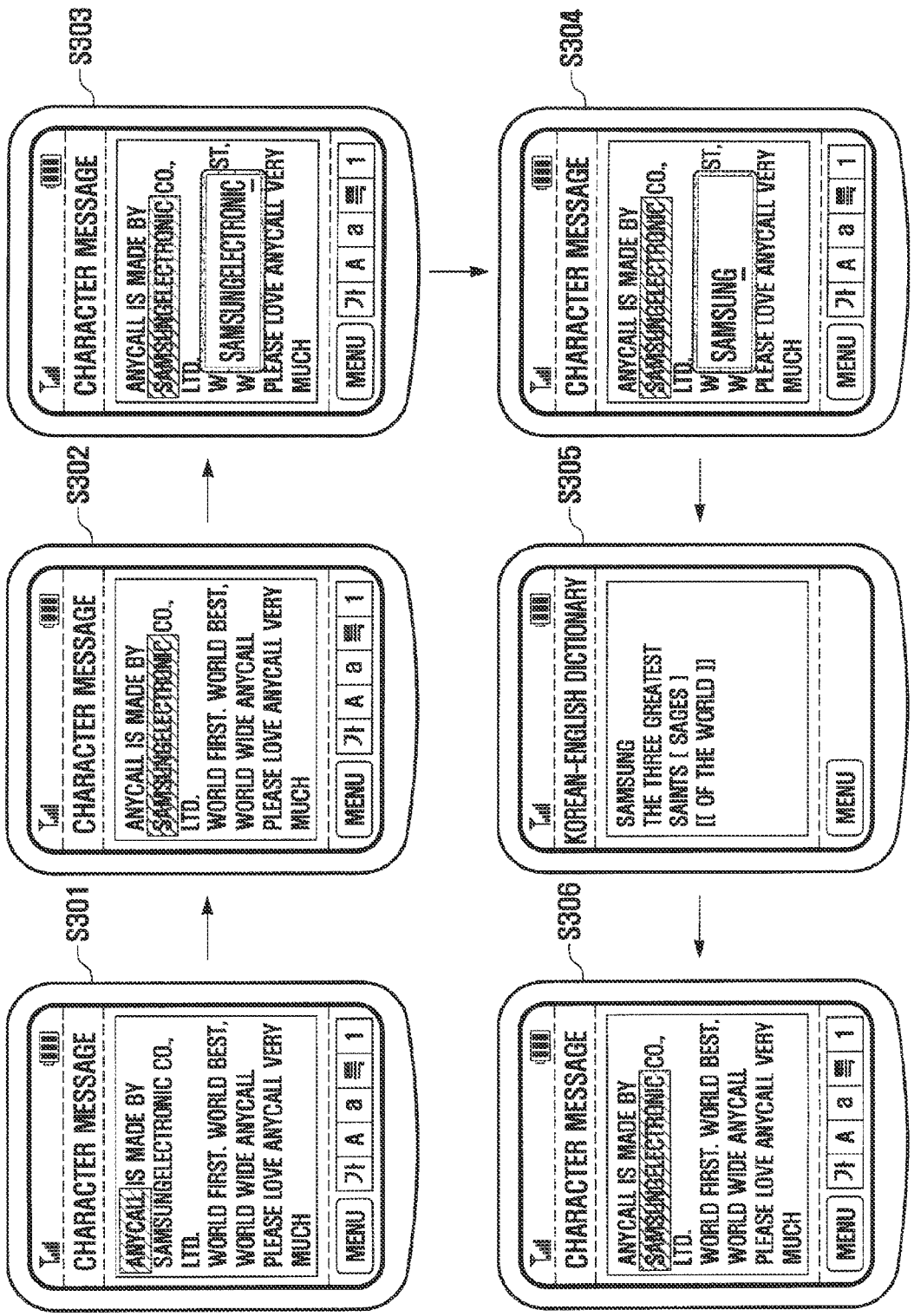

METHOD AND DEVICE FOR SELECTING A WORD TO BE DEFINED IN MOBILE COMMUNICATION TERMINAL HAVING AN ELECTRONIC DICTIONARY

CROSS REFERENCE TO RELATED APPLICATION

This application is a continuation application of a prior application Ser. No. 11/743,335 filed May 2, 2007, claims the benefit under 35 U.S.C. §119(a) of a Korean patent application number 10-2006-0040692, filed on May 4, 2006, in the Korean Intellectual Property Office, the entire disclosure of which is hereby incorporated by reference.

BACKGROUND OF THE INVENTION

1. Field of the Invention

The present invention relates to a mobile communication terminal including an electronic dictionary function, and more particularly, to a method and device in which a user can search for a definition of a word using an electronic dictionary while reading a text document in a mobile communication terminal.

2. Discussion of the Background

Recently manufactured mobile communication terminals may have various functions of other portable digital devices, such as a digital camera, MP3 player, and electronic dictionary, as well as their original function of being a mobile telephone.

However, even though more users may be using a mobile communication terminal having an electronic dictionary function, such terminals may have the following problems.

In order for the user to search for the meaning of a word using the terminal's electronic dictionary, the user may need to terminate a current mode (for example, a text document mode).

Then, the user may directly input a word to be searched for in a search window in an electronic dictionary menu, terminate the electronic dictionary menu after completing the search, and re-execute the previous mode.

Accordingly, because the user terminates a currently used mode in order to search for the word, executes an electronic dictionary menu, and directly inputs a word to search for, the processes are inconvenient. Further, the user may need to memorize the word to search for in order to input it into the search window.

For example, in order to search for the meaning of the word 'Samsung' included in a received character message using the terminal's electronic dictionary, the user should terminate the currently used character message mode and enter an electronic dictionary mode.

Further, because the user may need to directly input the word to be searched for in the search window, the user may need to memorize the word 'Samsung' before entering the electronic dictionary mode.

SUMMARY OF THE INVENTION

The present invention provides a method and device for selecting a word to be defined using an electronic dictionary function.

The present invention further provides a method and device for defining a word in a text document in real time using an electronic dictionary in a mobile communication terminal having an electronic dictionary function.

The present invention further provides a method and device for selecting and defining a word without terminating a currently active mode, in order to define a word in a text document provided on a screen of a mobile communication terminal.

The present invention further provides a method and device for providing a function of directly searching an electronic dictionary in a current mode, in order to define a word selected by a user in a text document provided on a screen of a mobile communication terminal, enabling direct input of the word to be defined in a search window such that it is not necessary for a user to memorize the word.

Additional features of the invention will be set forth in the description which follows, and in part will be apparent from the description, or may be learned by practice of the invention.

The present invention discloses a method for selecting a word to be defined using an electronic dictionary function in a mobile communication terminal. The method includes selecting a word in a displayed text document, displaying the selected word in a search window, searching for, if a request for searching for the displayed word is input, the displayed word, displaying information resulting from the search, and terminating display of the information and displaying the text document.

The present invention also discloses a method for selecting a word to be defined using an electronic dictionary function in a mobile communication terminal. The method includes selecting a word in a displayed text document, displaying the selected word in a search window, searching for, if a request for searching for the displayed word is input, the displayed word, and displaying information resulting from the search.

The present invention also discloses a mobile communication terminal comprising an electronic dictionary function. The mobile terminal includes a display unit to display a text document, a search window processor to display a word selected from the displayed text document in a search window in response to a first input, an electronic dictionary data storage unit to store a lexical meaning of the word, an electronic dictionary data processor to search for the word displayed in the search window in the electronic dictionary data storage unit, and a controller to output the lexical meaning of the word found in the electronic dictionary data storage unit to the display unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 is a diagram illustrating example display screens for selecting and defining a word in a mobile communication terminal having an electronic dictionary according to an exemplary embodiment of the present invention.

DETAILED DESCRIPTION OF ILLUSTRATED EMBODIMENTS

Figure 1:
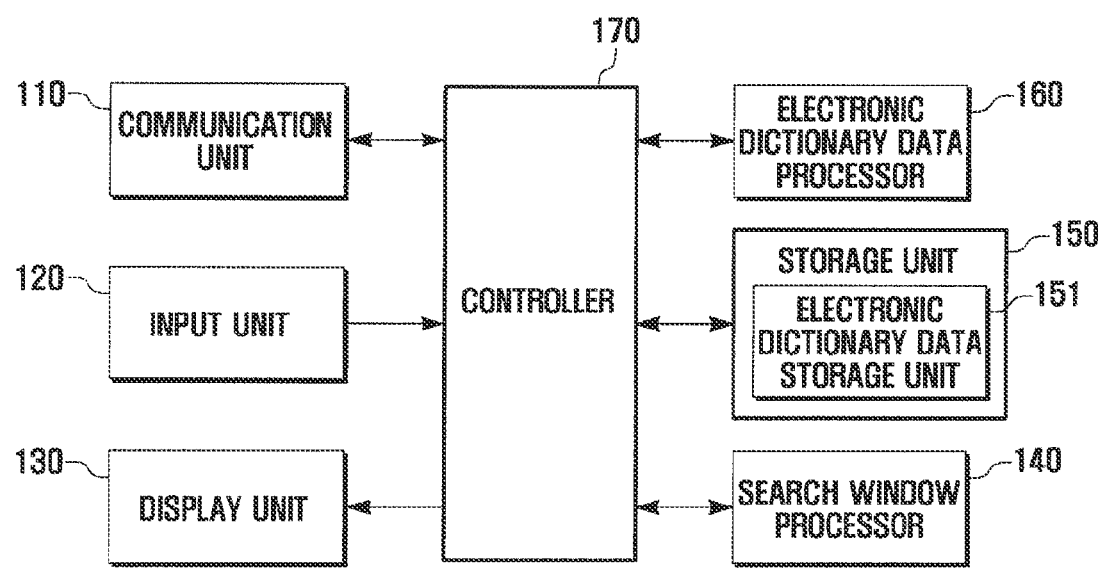
FIG. 1 is a block diagram illustrating a configuration of a mobile communication terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram illustrating a configuration of a mobile communication terminal according to an exemplary embodiment of the present invention.

Referring to FIG. 1, the mobile communication terminal includes a communication unit 110, input unit 120, display unit 130, search window processor 140, storage unit 150, electronic dictionary data processor 160, and controller 170.

The communication unit 110 enables the mobile communication terminal to perform wireless communication through a base station or a signal repeater using a mobile communication network. For example, the communication unit 110 may communicate with the mobile communication network to receive a text document (for example, a character message, news, E-mail, and e-book) from another mobile communication terminal or a data server.

The input unit 120 may include various function keys, numeric keys, special keys, character keys, key pad, touch screen, and/or touch pad, and outputs a key input signal, which may be input by the user, to the controller 170. For example, the input unit 120 receives a selection signal for movement and selection of a selection box, deletion of a character, and search of a word in a text document from a user and outputs the selection signal to the controller 170.

The display unit 130 may include a liquid crystal display (LCD). The display unit 130 displays various display data generated in the mobile communication terminal on a display screen. If the display unit 130 uses a touch screen, the display unit 130 may also work as an input unit.

The display unit 130 displays a key input screen for inputting an additional function set by the user or data and a screen for searching for a word using an electronic dictionary function, and displays dictionary information of a word found using an electronic dictionary function on a screen.

The search window processor 140 generates a selection box for selecting a word included in the text document displayed on the display unit 130 and processes movement and display of the selection box. The search window processor 140 designates a word of a text document as a block using the selection box within the text document.

Here, designating a word as a block using the selection box may be performed by dividing words included in the text document into a word that can be searched for using an electronic dictionary and a word that cannot be searched for using an electronic dictionary according to user request and designating the word that can be searched for as a block.

The search window processor 140 processes movement of the selection box according to a key input value (for example, the input of a vertical or horizontal direction key by the user) and activates a search window, including a word designated as a block within it, according to user request. For example, when a word is designated as a block by the selection box in the text document, if a direction key is input or a touch signal for moving the selection box is input, the search window processor 140 moves the selection box according to the input.

Further, if a key (for example, a cancellation key or a direction key) is input by the user on the activated search window, the search window processor 140 may delete characters existing in the activated search window, move a cursor according to the input key, or add new characters to the window.

Furthermore, when the selection box designates a word as a block, if a confirmation key is input, the search window processor 140 activates a word search window in which the word can be edited. The search window may be activated and displayed in a pop-up window form.

Further, the search window processor 140 may edit a word (for example, delete or add a character) in the search window in response to key input according to a direction key, a character key, a cancellation key, or combinations thereof on the activated search window. The search window processor 140 may also delete an entire word and replace it with another, as described below.

The storage unit 150 stores programs required for general operations of the mobile communication terminal. Further, the storage unit 150 stores user data and a text document and includes an electronic dictionary data storage unit 151 for storing various words and lexical meanings of the words in a database.

When the search window is activated within the text document and a confirmation key is input, the electronic dictionary data processor 160 searches for information about the word in the search window using the electronic dictionary data storage unit 151, and displays the found information (i.e. a definition) on a screen.

The controller 170 controls general operations of the mobile communication terminal. Further, when a text document is requested by the user, the controller 170 controls the selection box to be positioned at a preset position and controls an activation operation of a search window for editing and searching for a word at which the selection box is positioned according to a selection request of the user.

Further, the controller 170 controls the search for a word in the activated search window and the display of information about the found word through the display unit 130.

Figure 2A:
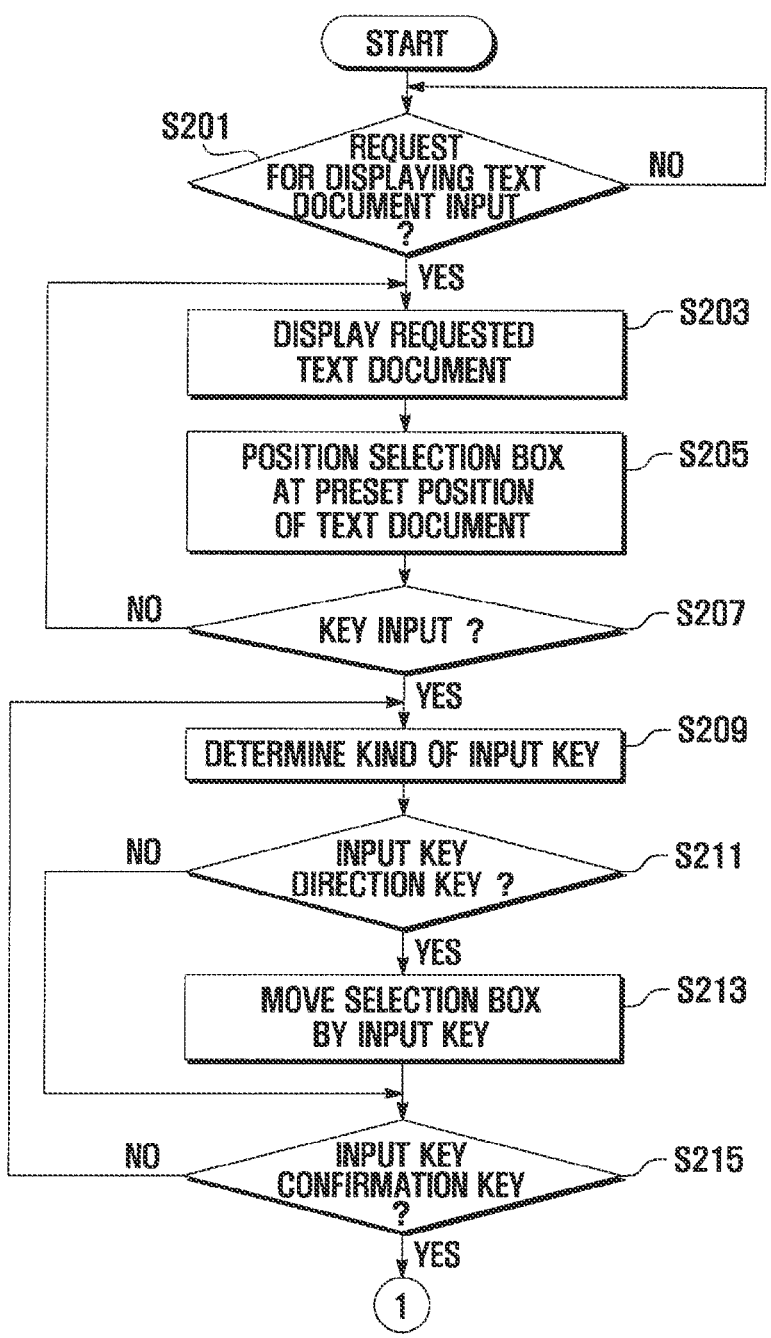
FIG. 2A and FIG. 2B are flowcharts illustrating a process of selecting and defining a word in a mobile communication terminal having an electronic dictionary according to an exemplary embodiment of the present invention.
Figure 2B:
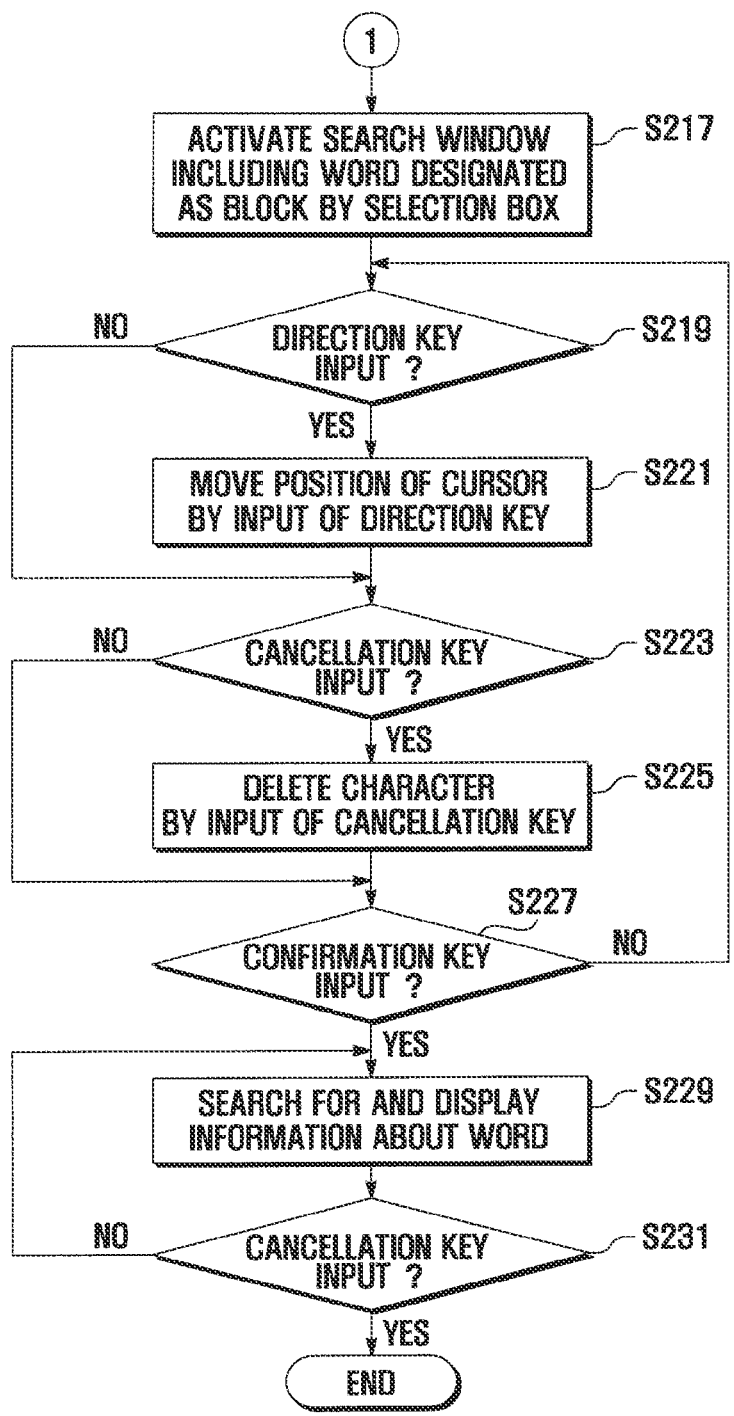

FIG. 2A and FIG. 2B are flowcharts illustrating a process of selecting and defining a word using an electronic dictionary in a mobile communication terminal according to an exemplary embodiment of the present invention.

Particularly, FIG. 2A and FIG. 2B show a process of searching for information about a word in a text document of the mobile communication terminal using an electronic dictionary function. The text document may include any text document such as a character message, news, E-mail, an e-book, and a memo.

Referring to FIG. 2A and FIG. 2B, the mobile communication terminal determines whether a request to display a text document stored therein is input by the user (S201). If a request to display a text document is input by the user, the mobile communication terminal displays the requested text document in the display unit 130 (S203).

The mobile communication terminal generates a selection box for selecting a word to be defined and displays the selection box at a preset position of the text document (S205). The selection box may be automatically displayed when the text document is displayed, or the selection box may be displayed in a text document in response to a request from a user. FIG.

2A describes the case where the selection box is automatically displayed when the text document is displayed.

The selection box designates a word as a block in order to select the word to define and may be controlled by a touch signal or key input (for example, a direction key, confirmation key, and cancellation key) of the user.

Further, the initial position of the selection box may be the first word of the first row of the text document and among words included in the text document, which are divided into and displayed as a word that can be searched for using an electronic dictionary and a word that cannot be searched for using an electronic dictionary. When the selection box is inserted and displayed in a text document in response to a key input by the user, the selection box may be positioned at the first word of the first row on the current display screen.

The mobile communication terminal determines whether a key is input in a text document mode (S207). If a key is input in the text document mode, the mobile communication terminal identifies a kind of the input key (S209). If a key is not input in the text document mode, the process is repeated.

The mobile communication terminal determines whether an input key is a direction key (S211). If so, the mobile communication terminal moves the displayed selection box in a direction of the input direction key (S213).

If the input key is not a direction key at step S211, the process continues at step S215.

The mobile communication terminal determines whether the input key is a confirmation key (S215). If so, the mobile communication terminal activates and displays a search window including the word designated as a block by the selection box (S217).

Here, the word designated as a block by the selection box may be displayed in the search window and a cursor may be displayed at a preset position in the search window.

The cursor is positioned so that a user may easily edit the word. The cursor may be omitted.

The cursor may be positioned at the far right character of the search window, and the search window may be positioned at a central portion of the screen (see S303 of FIG. 3).

Further, the mobile communication terminal performs an operation according to key input information input by the user on the search window. For example, if a character key is input by the user, the displayed word may be automatically deleted in an activated search window, and a character corresponding to the input of the character key is generated and displayed.

Further, if a cancellation key is input, a character, which corresponds to the cursor position, of the word displayed in the search window is deleted, and if a direction key is input, the displayed cursor moves.

When the search window is activated, the mobile communication terminal determines whether a preset key is input by the user, and performs an operation corresponding to the input key.

The mobile communication terminal determines whether the direction key is input on the search window (S219). If the direction key is input on the search window, the mobile communication terminal moves the displayed cursor according to the input of the direction key (S221).

The mobile communication terminal determines whether a cancellation key is input on the search window (S223). If so, the mobile communication terminal enables the cursor to delete a character in the search window while moving from a current position towards a left side of the window according to the number of times of the input of the cancellation key (S225).

That is, the mobile communication terminal may display only a word to be searched for in the search window by the input of the cancellation key.

In a state where a word to be searched for is displayed in the search window, the mobile communication terminal determines whether a confirmation key is input (S227). If a confirmation key is input, the mobile communication terminal searches for information about the word in the current search window using an electronic dictionary function in the electronic dictionary data storage unit 151 and displays the information on the display unit 130 (S229). In other words, the mobile communication terminal may provide a definition for the word in the current search window.

Thereafter, the mobile communication terminal determines whether a cancellation key is input by the user (S231). If a cancellation key is input, the mobile communication terminal terminates the current electronic dictionary search mode and returns to the text document mode.

After returning to the text document mode, the mobile communication terminal may position the selection box at the most recently selected word.

FIG. 3 is a diagram illustrating example display screens for selecting a word to be defined using an electronic dictionary in a mobile communication terminal according to an exemplary embodiment of the present invention.

Specifically, FIG. 3 shows display screens of a process of selecting a word (for example, 'Samsung') to be defined from a text document (for example, a received character message).

Referring to FIG. 3, the mobile communication terminal displays a text document by user request. When the text document is displayed, the mobile communication terminal provides a selection box for selecting a word within the text document.

Here, the selection box may be automatically positioned at the first word (for example, 'Anycall') of the first row in the text document (S301).

However, the present invention includes an exemplary embodiment of dividing words in the text document and displaying the words as a word that can be searched for using an electronic dictionary and a word that cannot be searched for using an electronic dictionary in the text document, and activating, when a touch signal is input by the user, a block corresponding to the touch signal and displaying a selection box as a block.

Further, the selection box designates a preset word as a block, and a size of the selection box changes according to the length of the word. Furthermore, the selection box may move horizontally and vertically and may be displayed by key input of the user. That is, the user can horizontally and vertically move the selection box to a position of a word to be selected by the user using a preset direction key of the mobile communication terminal.

As shown in FIG. 3, when the user inputs a down direction key once, the selection box moves to a position of the next word 'SamsungElectronic' by moving downward one space, and thus the word 'SamsungElectronic' is designated as a block (S302).

As in step S302, where the selection box is positioned at 'SamsungElectronic', which is a word including a word (for example, Samsung) the user wishes to have defined, the user inputs a confirmation key in order to search for a meaning of a word 'Samsung'.

The mobile communication terminal activates and displays a preset search window according to the input of the confirmation key.

In this case, the search window may display 'SamsungElectronic', which is the word designated as a block by the selection box, in a form of a pop-up window on the text document (S303).

Further, the search window may be provided as an input window for inputting character information. The word 'SamsungElectronic' can be edited on the input window.

Further, if character information other than the selected word 'SamsungElectronic' is input by key input of the user on the search window, the word 'SamsungElectronic' is automatically deleted, and the character information (for example, 'Anycall') corresponding to the key input can be input and searched.

As noted above, the search window may include a cursor in order to easily edit the word or identify the input character.

That is, if a character key is input by the user on the search window, the character is displayed, if a cancellation key is input, a character corresponding to the cursor is deleted, and if a direction key is input, the cursor moves according to the input key.

In this case, the character writing may be performed by deleting a previous character as described above, and by inputting a character corresponding to the character key at a position of the cursor.

Further, as in step S303, the search window may be positioned at a central portion of the display screen of the mobile communication terminal, and the cursor may be positioned at the far right side of the search window.

For example, at step S303, the word 'SamsungElectronic' is displayed on the search window, and the cursor is positioned at the far right character 'c' of the word 'SamsungElectronic'.

In this case, if the user presses the cancellation key ten times, the mobile communication terminal enables the cursor to be moved and the ten characters 'Electronic' on the right side of the search window are sequentially deleted by the input of the cancellation key (S304).

Next, in a state where preset characters are deleted by the input of the cancellation key, i.e. in a state where only 'Samsung', which is the word the user would like to have defined, is displayed in the search window, if the 'confirmation key' for performing the search is input, the mobile communication terminal performs an electronic dictionary function, and searches for information about the word 'Samsung'.

Thereafter, the mobile communication terminal displays dictionary information of 'Samsung' found using the electronic dictionary function on the display unit 130 (S305).

In this case, the dictionary information, i.e. a lexical meaning, may be displayed in a new information window on the text document window, and the text document window stays active.

Next, after acquiring information about 'Samsung' through the information window, if the user requests that the text document de displayed by inputting the cancellation key, the mobile communication terminal removes the information window displayed on the current screen, and returns to the text document mode.

In this case, the selection box may be positioned at the most recently selected word of the text document (for example, 'SamsungElectronic') (S306).

Although user key input is described above, the above operations may alternatively be performed with various input methods.

For example, if the display unit 130 of the mobile communication terminal includes a touch screen, a user may touch or drag the screen to move the selection box.

Further, with a touch applied to the selection box, for example, a double touch or a touch that is performed for longer than a preset time, a word within the selection box may be provided in an activated search window.

As described above, according to exemplary embodiments of the present invention, in a mobile communication terminal having an electronic dictionary function, a word can be searched for using an electronic dictionary without terminating a currently active text document mode while reading a text document (for example, a character message, news, E-mail, e-book, and memo), whereby the user can conveniently perform a search function of a text document and an electronic dictionary function.

Further, it is not necessary for a user to memorize a word to search for by interlocking a search function of the text document and the electronic dictionary function, and thus a word can be easily searched for in a currently active mode.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method performed by a handheld mobile communication terminal for offering a dictionary feature, the method comprising:
   displaying at least a portion of a text document on a display unit configured for the handheld mobile communication terminal;
   in response to at least one touch input for selecting a word, displaying an enlarged version of a part of the displayed text document and providing an indication of a selected word and a visual element for receiving a user request for dictionary information corresponding to the selected word among the part of the displayed text document, the visual element overlaying less than all of the displayed text document;
   in response to the user request for the dictionary information via the visual element, displaying a dictionary screen in place of the displayed text document so that the dictionary screen visually appears to be over the entire displayed text document, the dictionary screen showing the dictionary information corresponding to the selected word; and
   in response to a user request for termination of the dictionary screen, returning from the dictionary screen to a screen showing the displayed text document with the indication of the selected word remaining,
   wherein the enlarged version of the part of the displayed text document and the part of the displayed text document are both displayed at the same time.

2. The method of claim 1, wherein the dictionary screen visually replaces the displayed text document while continuing to display a notification.

3. The method of claim 2, wherein the notification includes both network state and battery state.

4. The method of claim 1, wherein the providing of the enlarged version of the part of the displayed text document and the providing of the visual element are performed in response to one touch input.

5. The method of claim 1, further comprising editing the part of the displayed text document in response to an editing input.

6. The method of claim 1, wherein the text document comprises at least one of a message, an email, a Social Network Service (SNS), a web page, and text received from a data server.

7. The method of claim 1, further comprising manipulating the selection of the word, in response to a drag input.

8. The method of claim 1, wherein the at least one touch input comprises a double touch input.

9. A non-transitory computer readable recording medium having recorded thereon a handheld mobile communication terminal program to perform operations, the operations comprising;

displaying at least a portion of a text document on a display unit configured for the handheld mobile communication terminal;

in response to at least one touch input for selecting a word, displaying an enlarged version of a part of the displayed text document and providing an indication of a selected word and a visual element for receiving a user request for dictionary information corresponding to the selected word among the part of the displayed text document, the visual element overlaying less than all of the displayed text document;

in response to the user request for the dictionary information via the visual element, displaying a dictionary screen in place of the displayed text document so that the dictionary screen visually appears to be over the entire displayed text document, the dictionary screen showing the dictionary information corresponding to the selected word; and in response to a user request for termination of the dictionary screen, returning from the dictionary screen to a screen showing the displayed text document with the indication of the selected word remaining, wherein the enlarged version of the part of the displayed text document and the part of the displayed text document are both displayed at the same time.

10. A handheld mobile communication terminal comprising:

a display unit configured for the handheld mobile communication terminal;

a storage unit for storing dictionary information; and at least one control processor for:

controlling the display unit to display at least a portion of a text document, in response to at least one touch input for selecting a word, displaying an enlarged version of a part of the displayed text document and providing an indication of a selected word and a visual element for receiving a user request for dictionary information corresponding to the selected word among the part of the displayed text document, the visual element overlaying less than all of the displayed text document, in response to the user request for the dictionary information via the visual element, controlling the display unit to display a dictionary screen in place of the displayed text document so that the dictionary screen visually appears to be over the entire displayed text document, the dictionary screen showing the dictionary information corresponding to the selected word, and in response to a user request for termination of the dictionary screen, controlling the display unit to return from the dictionary screen to a screen showing the displayed text document with the indication of the selected word remaining, wherein the enlarged version of the part of the displayed text document and the part of the displayed text document are both displayed at the same time.

11. The terminal of claim 10, wherein the dictionary screen is displayed over the displayed text document while continuing to display a notification.

12. The terminal of claim 11, wherein the notification includes both network state and battery state.

13. The terminal of claim 10, wherein the at least one control processor controls to provide the enlarged version of the part of the displayed text document and to provide the visual element in response to one touch input.

14. The terminal of claim 10, wherein the at least one control processor controls to edit the part of the displayed text document in response to an editing input.

15. The terminal of claim 10, wherein the text document comprises at least one of a message, an email, a Social Network Service (SNS), a web page, and text received from a data server.

16. The terminal of claim 10, wherein the at least one control processor manipulates the selection of the word, in response to a drag input.

17. The terminal of claim 10, wherein the at least one touch input comprises a double touch input.

* * * * *